United States Patent
Chae et al.

(10) Patent No.: US 6,889,268 B2
(45) Date of Patent: May 3, 2005

(54) MULTI-CHIP SYSTEM HAVING A CONTINUOUS BURST READ MODE OF OPERATION

(75) Inventors: Dong-Hyuk Chae, Gwanak-ku (KR); Heung-Soo Im, Yongin-shi (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 253 days.

(21) Appl. No.: 10/376,114

(22) Filed: Feb. 28, 2003

(65) Prior Publication Data
US 2004/0006658 A1 Jan. 8, 2004

(30) Foreign Application Priority Data
Jul. 3, 2002 (KR) .................. 10-2002-0038301

(51) Int. Cl.⁷ .................. G06F 13/00; G06F 12/00; G06F 13/28; G06F 3/06; G11C 8/00
(52) U.S. Cl. .................. 710/35; 710/2; 710/3; 710/4; 710/8; 710/9; 710/33; 710/61; 711/1; 711/2; 711/5; 711/100; 711/170; 365/185.11; 365/230.03
(58) Field of Search .................. 710/2–4, 7–9, 710/20, 21, 29, 32–35, 61; 711/1, 2, 100, 5, 101–105, 170, 172; 365/185.11, 189.01, 189.05, 230.01, 230.03, 230.06, 233

(56) References Cited

U.S. PATENT DOCUMENTS

| | | | | |
|---|---|---|---|---|
| 5,787,047 A | * | 7/1998 | Norris et al. | 365/230.04 |
| 6,006,288 A | * | 12/1999 | McIntyre, Jr. et al. | 710/35 |
| 6,009,494 A | * | 12/1999 | Pawlowski | 711/5 |
| 6,097,666 A | * | 8/2000 | Sakui et al. | 365/230.06 |
| 6,128,696 A | * | 10/2000 | Farmwald et al. | 711/105 |
| 6,185,656 B1 | * | 2/2001 | Pawlowski | 711/104 |
| 6,216,180 B1 | * | 4/2001 | Kendall et al. | 710/35 |
| 6,330,650 B1 | * | 12/2001 | Toda et al. | 711/167 |
| 6,700,831 B2 | * | 3/2004 | Feurle | 365/230.03 |
| 6,724,682 B2 | * | 4/2004 | Lee et al. | 365/230.06 |

* cited by examiner

*Primary Examiner*—Jeffrey Gaffin
*Assistant Examiner*—Tanh Q. Nguyen
(74) *Attorney, Agent, or Firm*—Marger Johnson & McCollom, P.C.

(57) ABSTRACT

Embodiments of the invention provide a multi-chip system that includes a first and a second semiconductor memory device. The memory devices are mounted in a single package. The multi-chip system has a continuous burst read mode of operation, in which a read operation can be successively carried out without latency even though an address region moves from the first semiconductor memory device to the second memory device.

11 Claims, 4 Drawing Sheets

MULTI-CHIP SYSTEM HAVING A CONTINUOUS BURST READ MODE OF OPERATION

CROSS REFERENCE TO RELATED APPLICATIONS

This application claims priority under 35 USC § 119 to Korean Patent Application No. 2002-38301, filed on Jul. 3, 2002, the contents of which are herein incorporated by reference in their entirety.

BACKGROUND OF THE INVENTION

1. Field of the Invention

This disclosure relates to semiconductor integrated circuit devices, and, in particular, to a semiconductor memory device that supports a continuous burst read mode of operation.

2. Description of the Related Art

Presently, many semiconductor memory devices (e.g., SRAM, DRAM, flash memories, and so forth) support a burst read mode of operation, or burst mode, in which data is continuously read out from a given start address synchronized with a clock signal from the external. In the burst mode, a constant delay time is needed until the first data is outputted from a memory device after a start address is inputted to the memory device. The clock number corresponding to the delay time is commonly called "latency" or "standby time". During the delay time, a sense amplifier circuit senses data from memory cells and the sensed data is temporarily stored in a register. Afterwards, data thus stored is outputted to the external through an output buffer circuit in synchronization with a rising and falling edge of a clock signal.

In case of an asynchronous or random access type in which data corresponding to an address is outputted whenever the address is inputted from the external, a semiconductor memory device includes as many sense amplifiers as the number of data lines. Unlike the random access type, a burst read type of semiconductor memory device reads out data corresponding to a burst length immediately and the read-out data is loaded on a data bus by one group. For this reason, the semiconductor memory device of the burst read type requires plural groups of sense amplifiers. Thus, in case of a semiconductor memory device supporting a burst read operation, the number of necessary sense amplifiers is determined by the number of data lines and the burst length.

While data is outputted to the external through one burst cycle, it is capable of outputting data of the next burst cycle without latency by reading out data of the next burst cycle and temporarily storing the read-out data in a register. This operation is referred to as a continuous burst read operation. With this continuous burst read operation, a semiconductor memory device can successively read out data from any address to the end of an address space. Accordingly, the continuous burst read operation enables a large volume of continuous data to be accessed at a high rate of speed.

SUMMARY OF THE INVENTION

Embodiments of the invention to provide a multi-chip system which, during a burst read operation, enables a continuous read operation from the first address of the second chip without latency, when an address reaches the last address of the first chip.

In accordance with embodiments of the invention, a multi-chip system is provided which has a burst read mode of operation with a plurality of internal burst cycles. A clock line transfers a clock signal, a first bus transfers control signals, a second bus selectively transfers data and an address, and first and second semiconductor memory devices are connected to the clock line, the first bus, and the second bus, respectively.

Each of the first and second semiconductor memory devices, according to embodiments of the invention, includes a memory cell array which stores data information; an address generating circuit which synchronously operates with a clock signal and sequentially generates an internal address for the burst read mode of operation in response to an external address; a data read circuit which reads out burst data from the memory cell array based on a part of the internal address, the burst data being outputted during the respective internal burst cycles; a read control circuit which is responsive to a read enable signal and controls a read operation of the data read circuit at a transition of either one of the external address and the internal address; a burst control circuit which is responsive to a burst enable signal and generates a latch enable signal synchronized with a clock signal; a data register which latches the burst data read out through the read circuit in response to the latch enable signal and sequentially outputs the latched burst data in response to the other of the internal address; and means that detect whether the internal address reaches a burst address set corresponding to the last one of the internal burst cycles and that generate the burst enable signal and the read enable signal for controlling the burst control circuit and the read control circuit based on a detection result.

According to embodiments of the invention, the address generating circuit generates an internal address every cycle of the clock signal, and the read control circuit makes the data read circuit operate every clock cycle corresponding to a burst length of each of the internal burst cycles.

According to embodiments of the invention, the means includes a first flag signal generating circuit which generates a first flag signal indicating whether a corresponding semiconductor memory device is mounted in the multi-chip system; a second flag signal generating circuit which generates a second flag signal indicating whether the corresponding semiconductor memory device belongs to an upper address region of the multi-chip system; and a boundary detecting circuit that operates responsive to the first and second flag signals and detects whether the one of the internal address reaches a burst address set corresponding to the last internal burst cycle, the boundary detecting circuit generating the read enable signal and the burst enable signal based on a detection result.

In the case that an address region of the first semiconductor memory device belongs to a lower one of an address region of the multi-chip system, when the internal address reaches the burst address set corresponding to the last internal burst cycle, the boundary detecting circuit makes the read enable signal inactive before the last internal burst cycle and the burst enable signal inactive after the last internal burst cycle.

In the case that an address region of the second semiconductor memory device belongs to an upper one of an address region of the multi-chip system, when the internal address reaches the burst address set corresponding to the last internal burst cycle, the boundary detecting circuit makes the read enable signal active before the last internal burst cycle and the burst enable signal active after the last internal burst cycle.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiment of the invention will be more fully described with reference to the attached drawings.

Recently, continuous increases in memory density has been required so as not to fall behind the rapid development of modern digital techniques. However, the current memory density increase rate does not satisfy such a strong requirement. In order to increase the memory density, a multi-chip package design has been widely used for DRAM, SRAM, flash memories, and so forth. With the multi-chip package design, a plurality of semiconductor integrated circuit chips are mounted in a package. In the case where at least two chips are included in a multi-chip package, two methods can be used to increase the memory capacity. The first method is to widen the bus width for data, which is used to form a memory module. The second method is to widen an address while maintaining the given bus width for data. A multi-chip system according to the preferred embodiment increases the memory capacity using the second method. In particular, during a burst read operation, the multi-chip system of the preferred embodiment enables a continuous read operation from the first address of the second chip without latency, when an address reaches the last address of the first chip. This will be more fully described hereinafter.

Figure 1:
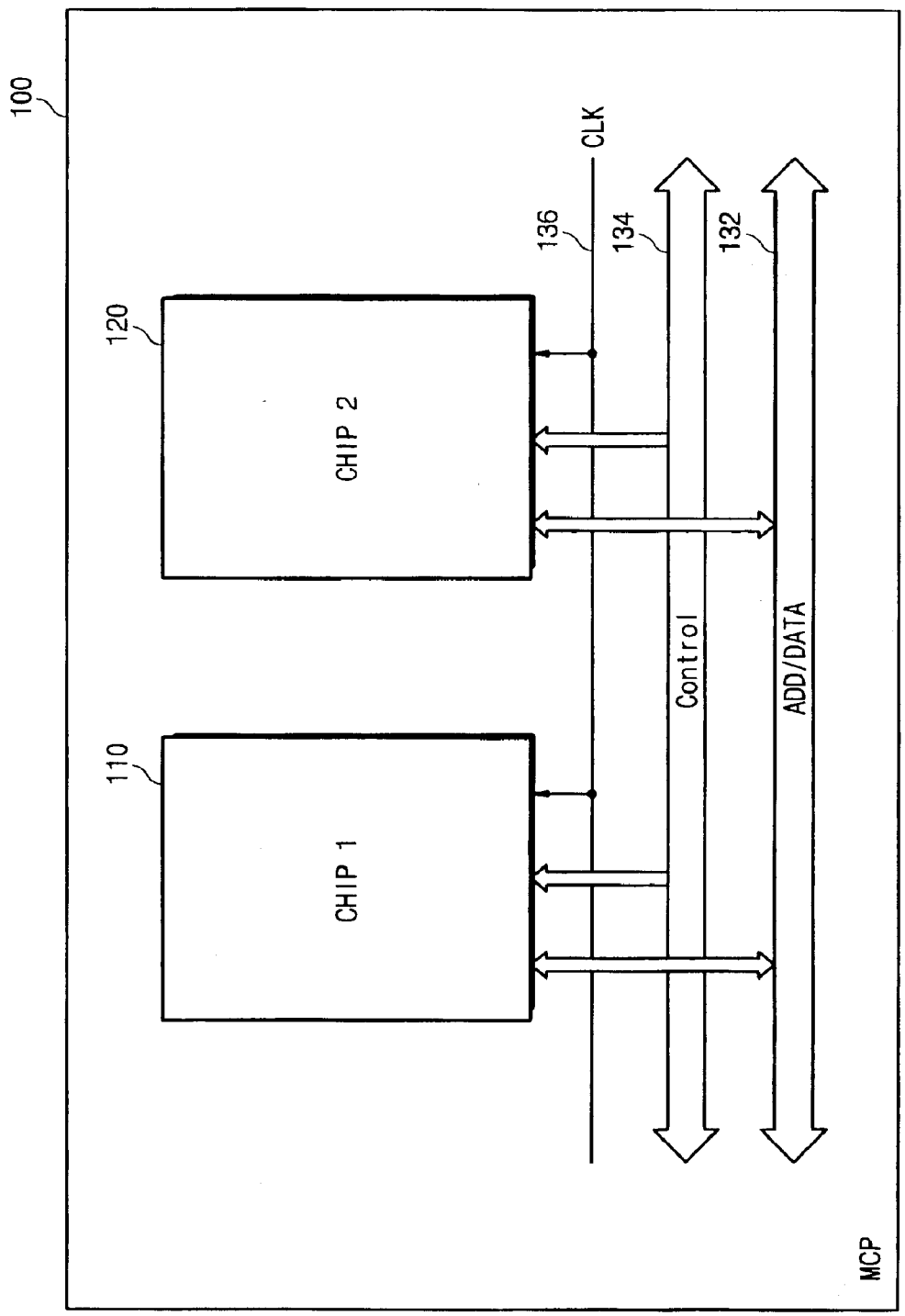
FIG. 1 is a block diagram of a multi-chip system according to an embodiment of the invention.

FIG. 1 is a block diagram of a multi-chip system according to an embodiment of the invention. Referring to FIG. 1, a multi-chip system 100 includes two semiconductor integrated circuit devices 110 and 120. The semiconductor integrated circuit devices 110 and 120 are semiconductor memory devices with the same capacity. The semiconductor memory devices 110 and 120 share an address/data bus 132, a control bus 134, and a clock line 136. In case of the multi-chip system according to this embodiment of the invention, the address/data bus 132 is used to transfer an address and data. The memory devices 110 and 120 included in the multi-chip system 100 operate as a single memory device.

Figure 2:
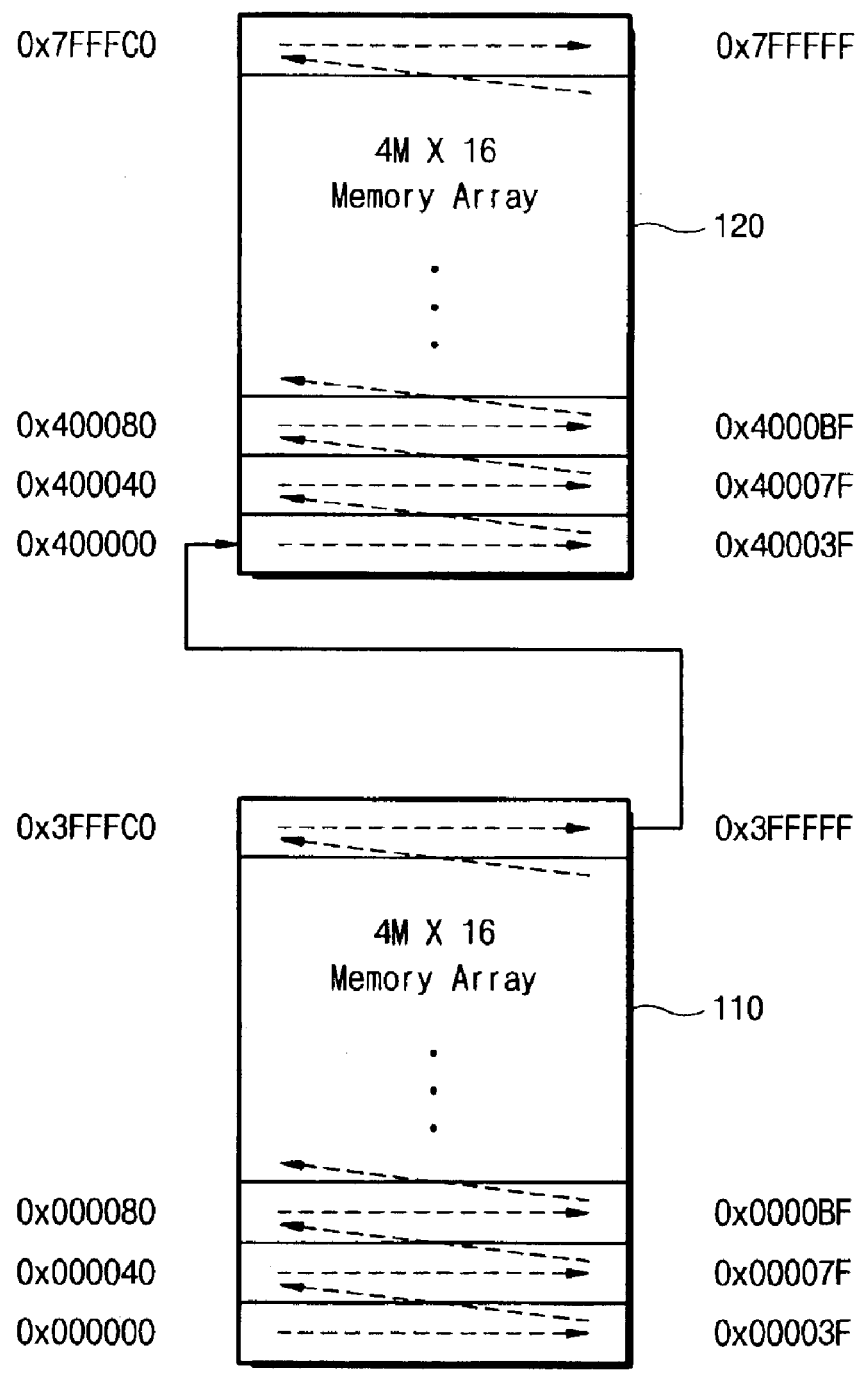
FIG. 2 is a diagram showing an address map of the first and second chips mounted in the multi-chip system of FIG. 1.

FIG. 2 shows an address map of the first chip 110 and the second chip 120 of the multi-chip system illustrated in FIG. 1. Referring to FIG. 2, the first chip 110 is a semiconductor memory device that has a memory capacity of 4M'16(64M) and an address region from "0x000000" to 0x3FFFFF. The second chip 120 is a semiconductor memory device that has a memory capacity of 4M×16 (64M) and an address region from "0x400000" to 0x7FFFFF. In the case that a continuous burst read operation of the present multi-chip system 100 is carried out, data stored in the first chip 110 is sequentially outputted and, without latency, data stored in the second chip 120 is sequentially outputted. This will be more fully described hereinafter.

Figure 3:
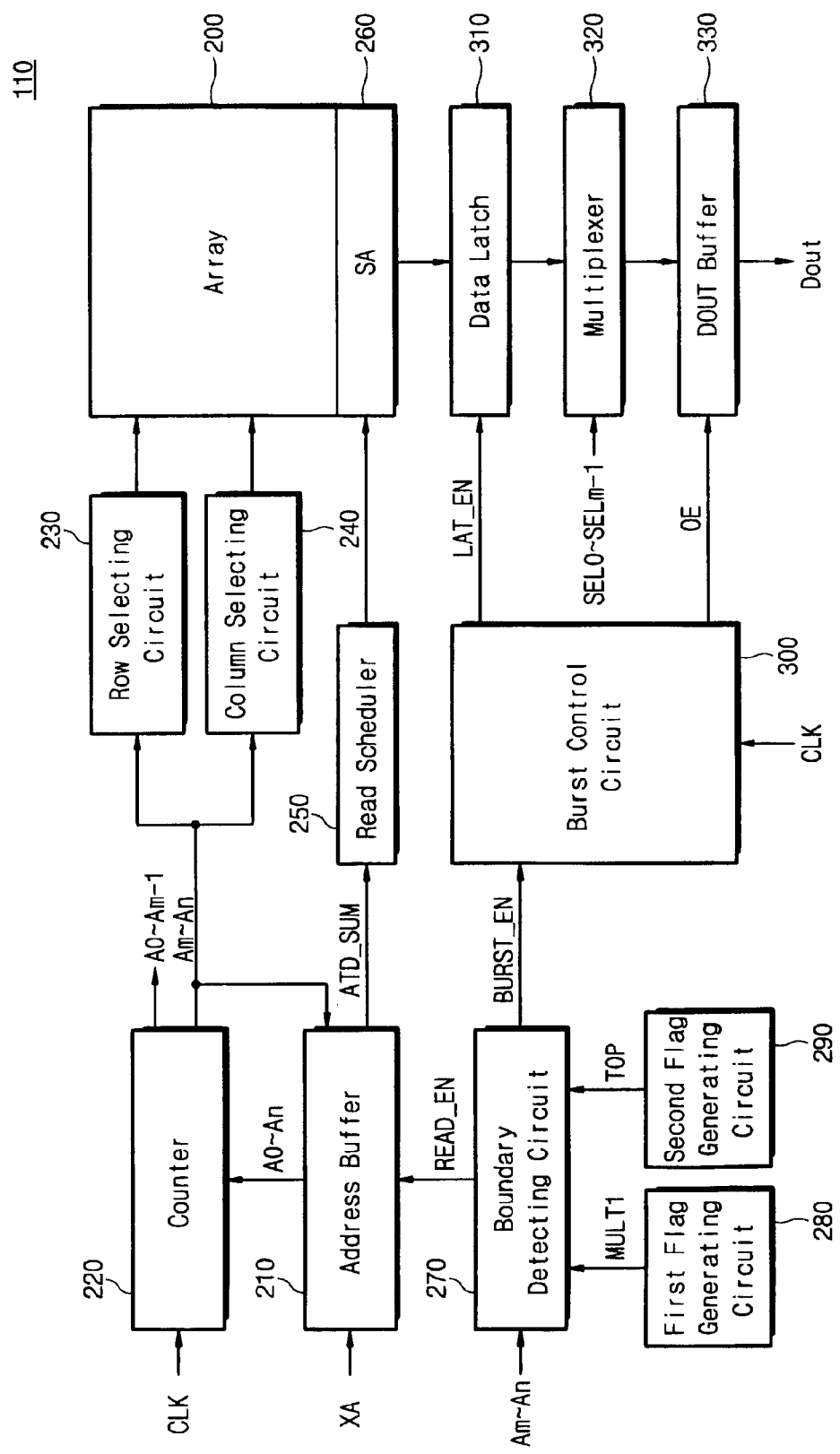
FIG. 3 is a block diagram one of the chips in FIG. 1 as a semiconductor memory device.

FIG. 3 is a block diagram showing either one of the semiconductor memory devices 110 and 120 illustrated in FIG. 1. Only one of the semiconductor memory devices 110 and 120 in FIG. 1 is shown in FIG. 3, but both of them are configured substantially the same as illustrated in FIG. 3. A continuous burst read operation according to the preferred embodiment is carried out through a plurality of internal burst cycles, which are defined as follows. Assume that the length of a n-bit data stream read out by a sensing operation is referred to as an internal burst length. In the case that an internal burst length is 4, four groups of data are read simultaneously during the Nth internal burst cycle, and the read-out data groups are sequentially outputted in synchronization with a clock signal CLK during the (N+1) th internal burst cycle. When data groups are outputted during the (N+1) th internal burst cycle, a read operation for the next (N+2) internal burst cycle will be carried out. This will be more fully described hereinafter.

Referring to FIG. 3, the semiconductor memory device 110 according to the preferred embodiment is a synchronous memory device that operates in synchronization with a clock signal CLK. The semiconductor memory device 110 includes a memory cell array 200 for storing data information. The memory cell array 200, although not shown in the figures, includes a plurality of memory cells arranged in a matrix of rows (or word lines) and columns (or bit lines). An address buffer circuit 210 latches an address XA0–XAn (n is an integer) from the external. The address A0–An from the address buffer circuit 210 is transferred to a counter circuit 220 acting as an internal address generating circuit. The counter circuit 220 receives the address A0–An from the address buffer circuit 210 and sequentially generates internal address A0–An for a continuous burst read operation in response to a clock signal CLK.

A part Am–An of the internal address A0–An that is generated from the counter circuit 220 is transferred to the address buffer circuit 210, a row selecting circuit 230, and a column selecting circuit 240, respectively. The row selecting circuit 230 selects one of the rows in response to the address signals Am–An, and the column selecting circuit 240 selects a part of the columns in response to the address signals Am–An from the counter circuit 220.

The address signals Am–An are also transferred to the address buffer circuit 210. The address buffer circuit 210 includes a transition detector, which operates in response to a control signal READ_EN from a boundary detecting circuit 270. The transition detector detects whether an address from the external or the counter circuit 220 transitions, and generates a pulse signal ATD_SUM as a detection result. A read scheduler 250 generates control signals for controlling a sense amplifier circuit 260 in response to the pulse signal ATD_SUM. The sense amplifier circuit 260 is controlled by the read scheduler 250, and senses and amplifies data from memory cells that are selected by the row and column selecting circuits 230 and 240. Namely the sense amplifier circuit 260 reads out data stored in the selected memory cells. The number of sense amplifiers that constitute the sense amplifier circuit 260 is determined by the internal burst length and the width of the data. For instance, in the case that the internal burst length is 4 and the width of data is '16, 64 sense amplifiers are needed to perform a continuous burst read operation.

In this embodiment, the counter circuit 220 generates an internal address every clock cycle. The transition detector in the address buffer circuit 210 generates the pulse signal ATD_SUM in response to an address transition every clock cycle corresponding to the internal burst length. For instance, in the case that an internal burst length is 4, the transition detector generates the pulse signal ATD_SUM in response to an address transition every 4-clock cycle. The row selecting circuit 230, the column selecting circuit 240, and the sense amplifier circuit 260 form a data read circuit, while the address buffer circuit 210 and the read scheduler 250 form a read control circuit.

Returning to FIG. 3, the semiconductor memory device 110 of this embodiment further also includes the boundary detecting circuit 270, the first flag generating circuit 280 and the second flag generating circuit 290. The boundary detecting circuit 270 operates responsive to flag signals MULTI and TOP, and detects whether an internal address Am–An from the counter circuit 220 indicates an address boundary region between the first chip 110 and the second chip 120 in the multi-chip system 110. The boundary detecting circuit 270 outputs control signals READ_EN and BURST_EN based on a detection result. The first flag generating circuit 280 outputs the first flag signal MULTI indicating whether the semiconductor memory device 110 is mounted in a multi-chip package. The second flag generating circuit 290 outputs the second flag signal TOP indicating whether the semiconductor memory device 110 belongs to a lower address region of the multi-chip system.

In this embodiment, the first and second flag generating circuits 280 and 290 can be implemented using either one of a bonding pad and a laser fuse, respectively.

A burst control circuit 300 is further included in the semiconductor memory device 110. The burst control circuit 300 operates responsively to the control signal BURST_EN from the boundary detecting circuit 270, and generates an output pulse signal OE and a latch signal LAT_EN that are synchronized with the clock signal CLK. As described above, data corresponding to an internal burst length is read out through the sense amplifier circuit 260, and the read-out data is temporarily stored in a data latch circuit 310 in synchronization with the latch signal LAT_EN. For example, in the case that the number of data lines is 16 and the internal burst length is 4, 4-word data is read out at once, and the read-out 4-word data is latched in the data latch circuit 310. A multiplexer 320 sequentially selects the latched data in the data latch circuit 310 in response to selection signals SEL0–SELm–1. The selection signals SEL0–SELm–1 are generated using address signals A0–Am–1 that are outputted from the counter circuit 220. For instance, using the address signals A0–Am–1, the selection signals SEL0–SELm–1 are "00" when the first word data is selected, and when the selection signals SEL0–SELm–1 are "10" the second word data is selected. When the selection signals SEL0–SELm–1 are "01" the third word data is selected, and when the selection signals SEL0–SELm –1 are "11" the fourth word data is selected. A data output buffer circuit 330 outputs data selected by the multiplexer 320 in response to the output pulse signal OE.

Figure 4:
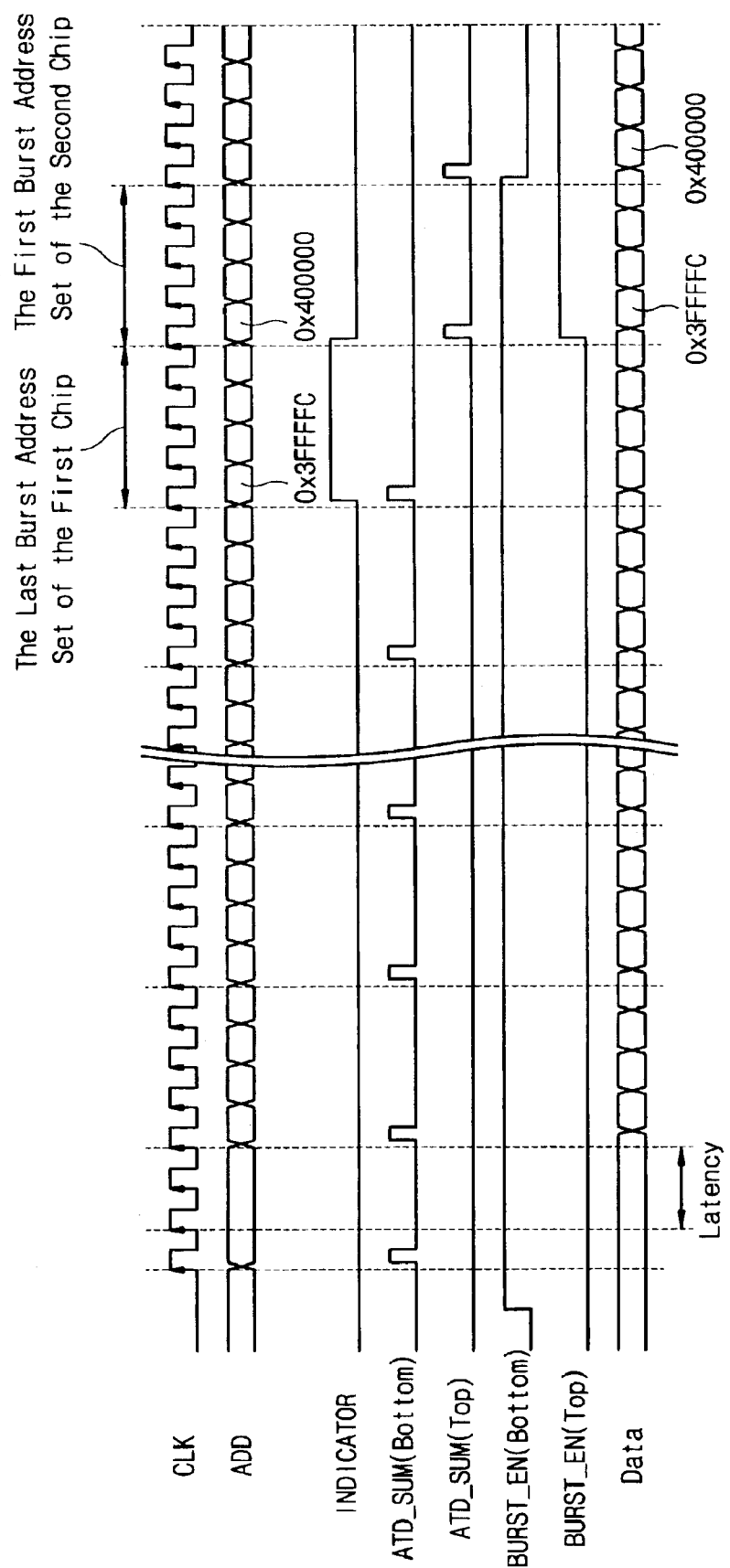
FIG. 4 is a timing diagram for describing a continuous burst read operation of a multi-chip system according to embodiments of the invention.

FIG. 4 is a timing diagram for describing a continuous burst read operation of a multi-chip system according to embodiments of the invention. A continuous burst read operation according to embodiments of the invention will now be described with reference to FIGS. 1–4. Hereinafter, the first chip 110 and the second chip 120 that are mounted in a multi-chip system 100 are referred to as the first semiconductor memory device 110 and the second semiconductor memory device, respectively.

The first flag generating circuit 280 in each of the first and second semiconductor memory devices 110 and 120 is programmed so as to generate a flag signal MULTI indicating that each memory device is mounted in a multi-chip package. The second flag generating circuit 290 of the first semiconductor memory device 110 is programmed so as to generate a flag signal TOP indicating that an address region of the first semiconductor memory device 110 belongs to a lower address region of the multi-chip system. The second flag generating circuit 290 of the second semiconductor memory device 110 is programmed so as to generate a flag signal TOP indicating that an address region of the second semiconductor memory device 120 belongs to an upper address region of the multi-chip system. In such conditions, when the multi-chip system operates, a boundary detecting circuit 270 of the first memory device 110 activates control signals READ_EN and BURST_EN while a boundary detecting circuit 270 of the second memory device 120 inactivates control signals READ_EN and BURST_EN.

Once the continuous burst read operation commences, the first and second semiconductor memory devices 110 and 120 in the multi-chip system 100 are simultaneously supplied with an external address XA. The address thus provided is temporarily stored in an address buffer circuit 210 in each of the first and second memory devices 110 and 120. While a read operation is performed for the first semiconductor memory device 110, it is not performed the second semiconductor memory device 120. Like the first semiconductor memory device 110, only a counter circuit 220 of the second semiconductor memory device 120 sequentially generates internal addresses in response to a clock signal CLK.

A transition detector in an address buffer circuit 210 of the first memory device 110 generates a pulse signal ATM_SUM in response to a transition of the external address XA. At the same time, the counter circuit 220 receives address signals A0–An from the address buffer circuit 210 and sequentially generates internal addresses in response to a clock signal CLK. A part Am–An of an internal address A0–An thus generated is transferred to row and column selecting circuits 230 and 240, so that memory cells are selected by the row and column selecting circuit 230 and 240. Data stored in the selected memory cells is read out through a sense amplifier circuit 260. The operation of the sense amplifier circuit 260 is controlled by a read scheduler 250 that operates responsive to the pulse signal ATD_SUM from the address buffer circuit 210.

In the case that an internal burst length is 4, as set forth above, 4-word data is read out from the memory cell array 200 via the sense amplifier circuit 260 based on the first internal address that is generated by the counter circuit 220.

A burst control circuit 300 operates responsive to a control signal BURST_EN from a boundary detecting circuit 270, and generates a latch signal LAT_EN and an output pulse signal OE in synchronization with the clock signal CLK. A data latch circuit 310 latches 4-word data, read out by the sense amplifier circuit 260, in response to the latch signal LAT_EN. A multiplexer 320 sequentially outputs the latched 4-word data to a data output buffer circuit 330 in response to selective activation of selection signals SEL0–SELm–1 . The data output buffer circuit 330 outputs four 1-word data, which is sequentially outputted from the multiplexer 320, in response to the output pulse signal OE.

While data corresponding to an internal burst length is outputted to the external, data to be outputted in the next burst cycle will be read out by the sense amplifier circuit 260. A more detailed description follows. As described above, while the counter circuit 220 generates an internal address every clock cycle, the transition detector of the address buffer circuit 210 generates the pulse signal ATD_

SUM every 4-clock cycle. When the counter 220 generates an internal address for a next internal burst cycle after an input of an external address, as illustrated in FIG. 4, the pulse signal ATD_SUM is generated. This means that data for the next internal burst cycle is read out by the sense amplifier circuit 260 in the same manner as described above. That is, as illustrated in FIG. 4, while previously read-out data is outputted, data to be outputted during a next internal burst cycle is read out via the sense amplifier circuit 260.

Internal addresses in internal burst cycles are generated as many times as an internal burst length (e.g., four times). This is referred to as a burst address set. For example, the first burst address set is formed from 0x000000 to 0x000003, and the second burst address set is formed from 0x000004 to 0x000007. The last burst address set of the first semiconductor memory device 110 is formed from 0x3FFFFC to 0x3FFFFF.

Read operations for the rest of the burst address sets are performed in the same manner as described above. When an internal address of 0x3FFFFC that belongs to the last burst address set of the first memory device 110 is generated, the boundary detecting circuit 270 of the first memory device 110 internally generates a detection signal INDICATOR in response to an internal address of 0x3FFFFC, as illustrated in FIG. 4. Similarly, when an internal address of 0x3FFFFC that belongs to the last burst address set of the second memory device 120 is generated, the boundary detecting circuit 270 of the second memory device 120 internally generates a detection signal INDICATOR in response to an internal address of 0x3FFFFC.

The boundary detecting circuit 270 of the second semiconductor memory device 120 activates a control signal READ_EN after the detection signal INDICATOR is generated and a time elapses. This makes it operate as a transition detector in an address buffer circuit 210 of the second memory device 120. On the other hand, the boundary detecting circuit 270 of the first memory device 110 inactivates the control signal READ_EN after the detection signal INDICATOR is generated and a time elapses. This makes the transition detector in the buffer circuit 210 of the first memory device 110 stop generating the pulse signal ATD_SUM even though the counter circuit 220 of the first memory device 110 operates. After data corresponding to the last burst address set of the first memory device 110 is outputted, the boundary detecting circuit 270 of the first memory device 110 inactivates the control signal BURST_EN. This makes the burst control circuit 300 of the first memory device 110 inactive, so that circuits (e.g., 310, 320, and 330) forming a data output path do not operate. That is, while the first/second semiconductor memory device 110/120 outputs data, the second/first semiconductor memory device 120/110 inactivates its data output buffer circuit. This is to prevent a bus collision between the first and second semiconductor memory devices 110 and 120.

Since the transition detector in the address buffer circuit 210 of the second semiconductor memory device 120 is operating, it generates the pulse signal ATD_SUM every 4-clock cycle when the counter circuit 220 of the second memory device 120 generates an internal address A0–An. This allows the read scheduler 250 of the second memory device 120 to control a read operation of the sense amplifier circuit 260. The sense amplifier circuit 260 reads out data from memory cells that are appointed by internal address signals Am–An under the control of the read scheduler 250. While 4-word data corresponding to the last burst address set of the first semiconductor memory device 110 is outputted, a read operation is carried out with respect to the first burst address set of the second semiconductor memory device 120. After 4-word data corresponding to the last burst address set is outputted, as described above, a data output path of the first semiconductor memory device 110 is inactivated. Afterwards, data stored in the second semiconductor memory device will be sequentially read out by the same manner as described above.

With a multi-chip system according to the preferred embodiment of the invention, if an internal address generated in the first semiconductor memory device 110 reaches the last burst address set of the first semiconductor memory device 110, data corresponding to the first burst address set of the second semiconductor memory device 120 is continuously read out. This is made by activating a control signal BURST_EN of the second semiconductor memory device 120 when the first semiconductor memory 110 device outputs data corresponding to the last burst address set. Accordingly, a continuous read operation can be performed without latency even though an address region moves from the first semiconductor memory device 110 in the multi-chip system 100 to the second semiconductor memory device 120 therein.

The invention has been described using exemplary preferred embodiments. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A synchronous semiconductor memory device that includes a burst read mode of operation having a plurality of internal burst cycles, comprising:

a memory cell array that stores data information;

an address generating circuit that operates synchronized with a clock signal and sequentially generates an internal address for the burst read mode of operation in response to an external address;

a data read circuit that reads out burst data from the memory cell array based on a part of the internal address, the burst data being outputted during the respective internal burst cycles;

a read control circuit that operates responsive to a read enable signal and controls a read operation of the data read circuit at a transition of either one of the external address and the internal address;

a burst control circuit that operates responsive to a burst enable signal and generates a latch enable signal synchronized with the clock signal;

a data register that latches the burst data read out through the read circuit in response to the latch enable signal and sequentially outputs the latched burst data in response to another part of the internal address; and a detection means that detects whether the internal address reaches a burst address set corresponding to the last one of the internal burst cycles and generates the burst enable signal and the read enable signal for controlling the burst control circuit and the read control circuit based on a detection result.

2. The synchronous semiconductor memory device according to claim 1, wherein the address generating circuit generates an internal address every cycle of the clock signal, and the read control circuit makes the data read circuit operate every clock cycle corresponding to a burst length of each of the internal burst cycles.

3. The synchronous semiconductor memory device according to claim 1, wherein when an internal address reaches a burst address set corresponding to the last internal burst cycles, the detection means makes the burst enable signal inactive after burst data of the last burst address set is outputted.

4. The synchronous semiconductor memory device according to claim 3, wherein when an internal address reaches a burst address set corresponding to the last internal burst cycles, the detection means makes the read enable signal inactive before the last internal burst cycle.

5. A multi-chip system that includes a burst read mode of operation having a plurality of internal burst cycles, comprising:

a clock line that transfers a clock signal;

a first bus that transfers control signals;

a second bus that selectively transfers data and an address;

a first semiconductor memory device that is connected to the clock line and the first bus; and a second semiconductor memory device that is connected to the clock line and the second bus, wherein each of the first and second semiconductor memory devices comprise a memory cell array that stores data information;

an address generating circuit that operates synchronized with the clock signal and sequentially generates an internal address for the burst read mode of operation in response to an external address;

a data read circuit that reads out burst data from the memory cell array based on a part of the internal address, the burst data being outputted during the respective internal burst cycles;

a read control circuit that operates responsive to a read enable signal and controls a read operation of the data read circuit at a transition of either one of the external address and the internal address;

a burst control circuit that operates responsive to a burst enable signal and generates a latch enable signal synchronized with the clock signal;

a data register that latches the burst data read out through the read circuit in response to the latch enable signal and sequentially outputs the latched burst data in response to another part of the internal address; and detection means that detect whether the internal address reaches a burst address set corresponding to the last one of the internal burst cycles and generates the burst enable signal and the read enable signal for controlling the burst control circuit and the read control circuit based on a detection result.

6. The multi-chip system according to claim 5, wherein the address generating circuit generates an internal address every cycle of the clock signal, and the read control circuit makes the data read circuit operate every clock cycle corresponding to a burst length of each of the internal burst cycles.

7. The multi-chip system according to claim 6, wherein the detection means includes:

a first flag signal generating circuit that generates a first flag signal indicating whether a corresponding semiconductor memory device is mounted in the multi-chip system;

a second flag signal generating circuit that generates a second flag signal indicating whether the corresponding semiconductor memory device belongs to an upper address region of the multi-chip system; and a boundary detecting circuit that operates responsive to the first and second flag signals and detects whether the one of the internal address reaches a burst address set corresponding to the last internal burst cycle, the boundary detecting circuit generating the read enable signal and the burst enable signal based on a detection result.

8. The multi-chip system according to claim 7, wherein in the case that an address region of the first semiconductor memory device belongs to a lower one of an address region of the multi-chip system, when the internal address reaches the burst address set corresponding to the last internal burst cycle, the boundary detecting circuit makes the read enable signal inactive before the last internal burst cycle and the burst enable signal inactive after the last internal burst cycle.

9. The multi-chip system according to claim 7, wherein in the case that an address region of the second semiconductor memory device belongs to an upper one of an address region of the multi-chip system, when the internal address reaches the burst address set corresponding to the last internal burst cycle, the boundary detecting circuit makes the read enable signal active before the last internal burst cycle and the burst enable signal active after the last internal burst cycle.

10. The multi-chip system according to claim 7, wherein both the first flag signal generating circuit and the second flag signal generating circuit comprise a bonding pad.

11. The multi-chip system according to claim 7, wherein both the first flag signal generating circuit and the second flag signal generating circuit comprise a laser fuse.

* * * * *